United States Patent [19]

O'Brien

[11] 4,333,817

[45] Jun. 8, 1982

[54] SEPARATION OF NORMALLY GASEOUS HYDROCARBONS FROM A CATALYTIC REFORMING EFFLUENT AND RECOVERY OF PURIFIED HYDROGEN

[75] Inventor: Dennis E. O'Brien, Arlington Heights, Ill.

[73] Assignee: UOP Inc., Des Plaines, Ill.

[21] Appl. No.: 228,517

[22] Filed: Jan. 26, 1981

[51] Int. Cl.³ .................... C10G 47/00; C10G 49/22
[52] U.S. Cl. .................... 208/101; 208/134; 208/138; 585/655
[58] Field of Search .............. 208/101, 134, 138; 585/655

[56] References Cited

U.S. PATENT DOCUMENTS

| | | | |
|---|---|---|---|
| 3,431,195 | 3/1969 | Storch et al. | 208/101 |
| 3,470,084 | 9/1969 | Scott | 208/101 |
| 3,520,799 | 7/1970 | Forbes | 208/101 |
| 3,520,800 | 7/1970 | Forbes | 208/101 |
| 3,882,014 | 5/1975 | Monday et al. | 208/101 |
| 4,159,937 | 7/1979 | Scott | 208/101 |

Primary Examiner—Curtis R. Davis
Attorney, Agent, or Firm—James R. Hoatson, Jr.; Robert W. Welch; William H. Page, II

[57] ABSTRACT

A process for the catalytic reforming of a hydrocarbonaceous feedstock, preferably to produce high quality gasoline boiling range products, is disclosed. Relatively impure hydrogen is separated from the reforming zone effluent, compressed, and recontacted with at least a portion of the liquid reformate product to provide relatively pure hydrogen, a portion of which is recycled to the reforming zone. The balance is further compressed and recontacted with at least a portion of the liquid reformate product in a plural stage absorption zone to provide an improved recovery of normally gaseous hydrocarbons as well as an improved recovery of purified hydrogen at a pressure suitable, for example, the relatively high pressure hydrotreating of sulfur-containing feedstocks.

5 Claims, 1 Drawing Figure

U.S. Patent  Jun. 8, 1982  4,333,817
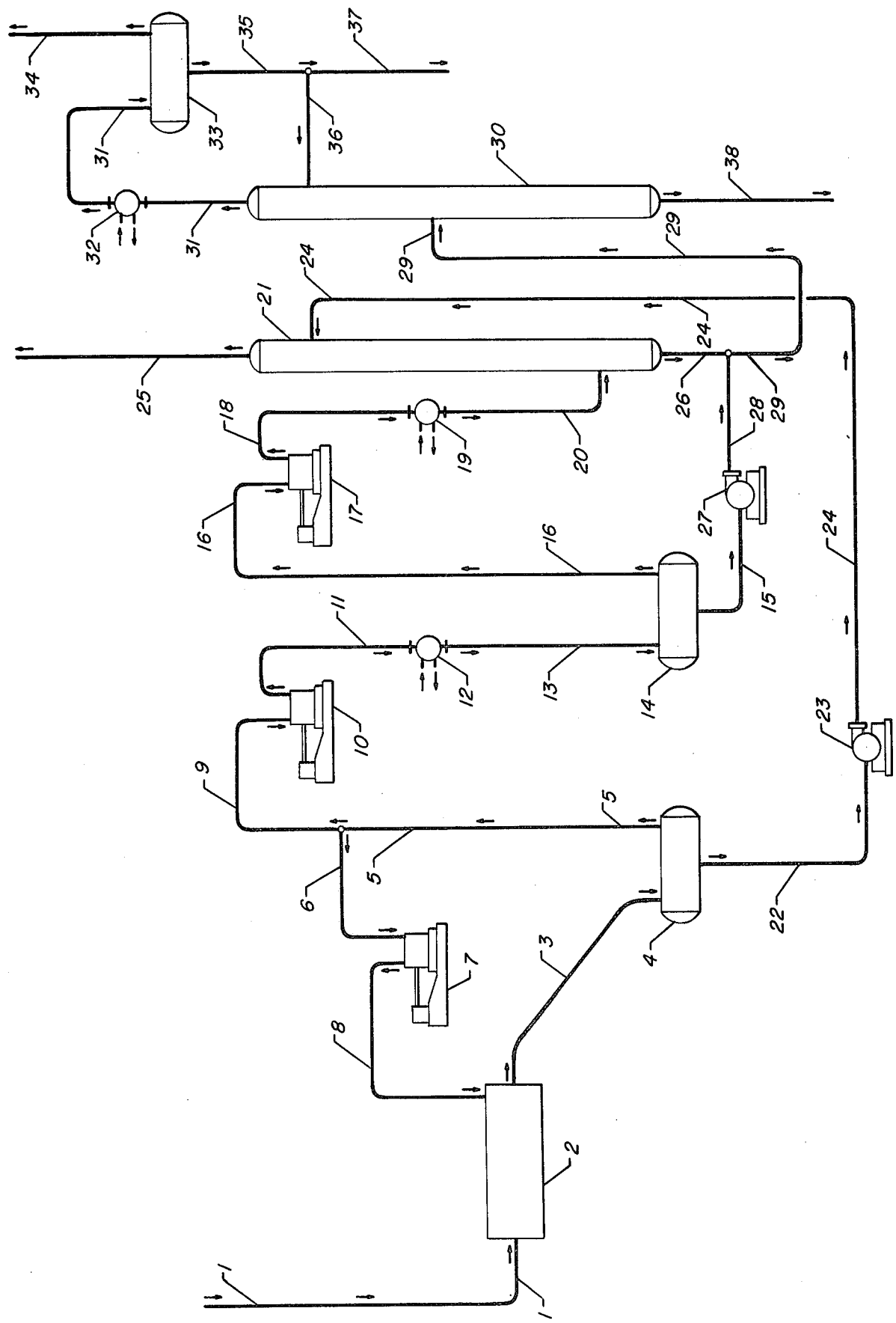

SEPARATION OF NORMALLY GASEOUS HYDROCARBONS FROM A CATALYTIC REFORMING EFFLUENT AND RECOVERY OF PURIFIED HYDROGEN

This invention relates to a hydrocarbon conversion process effected in the presence of hydrogen, especially a hydrocarbon conversion process involving dehydrogenation. More particularly, this invention relates to a catalytic reforming process to convert a hydrocarbon feedstock into gasoline boiling range products, and is specifically directed to the recovery of light, normally gaseous hydrocarbons from admixture with the net excess hydrogen from said process.

It is well known that high quality petroleum products in the gasoline boiling range including, for example, aromatic hydrocarbons such as benzene, toluene and the xylenes, are produced by the catalytic reforming process wherein a naphtha fraction is passed in contact with a platinum-containing catalyst in the presence of hydrogen. One of the predominant reactions of the reforming process involves the dehydrogenation of naphthenic hydrocarbons. While a considerable portion of the hydrogen recovered in the effluent from the reforming zone is required for recycle purposes, a substantial net excess of hydrogen is available for other uses, for example, the hydrotreating of sulfur-containing petroleum feedstocks.

However, catalytic reforming also involves a hydrocracking function among the products of which are relatively low molecular weight hydrocarbons including the normally gaseous hydrocarbons such as methane, ethane, propane and the butanes, substantial amounts of which are recovered admixed with the hydrogen separated from the reforming zone effluent. These normally gaseous hydrocarbons have the effect of lowering the hydrogen purity to the extent that purification is required before the hydrogen is suitable for use in other hydrocarbon conversion or treating processes. Aside from a desire to recover high purity hydrogen, it is frequently desirable to maximize the recovery of $C_3$–$C_4$ hydrocarbons to satisfy a demand by other hydrocarbon conversion or organic synthesis processes.

Related prior art schemes involving the separation and recovery of hydrogen generally operate the catalytic reforming zone at a pressure of from about 250 to about 450 psig., with pressures in the lower range being preferred, and the effluent from the reforming zone is separated at a relatively low pressure into a hydrogen-rich gaseous phase and a liquid hydrocarbon phase. The low pressure separation is effected in a gas-liquid separator following the reforming zone, and said separator is operated at substantially the same pressure as the reforming zone, allowing for pressure drop through the system. This pressure drop will generally involve from about 50 to about 150 psig. The total hydrogen-rich gaseous phase from the low pressure separator is then compressed and admixed with at least a portion of the liquid hydrocarbon phase from the low pressure separator, and the mixture is subjected to a second gas-liquid separation to yield a gaseous phase relatively rich in hydrogen. This last mentioned gas-liquid separation is at a pressure suitable for recycling at least a portion of the hydrogen-rich gaseous phase to the catalytic reforming zone at the reforming pressure maintained therein, and the balance is available at said pressure as net hydrogen for use, for example, in the hydrotreating of sulfur-containing feedstocks. U.S. Pat. Nos. 3,431,195 and 3,520,799 are representative of the desired reforming operation.

The recycled portion of said hydrogen-rich gaseous phase is invariably the greater portion thereof, and the balance, commonly referred to as the net hydrogen, is utilized primarily in the hydrotreating of sulfur-containing feedstocks at a relatively high pressure, say from about 300 to about 800 psig. or more. Prior to utilization in the hydrotreating process, the net hydrogen recovered from the reforming operation must therefore be increased in pressure, particularly when the reforming zone is operated at the preferred low pressures.

It would therefore be desirable to operate the catalytic reforming process so as to produce hydrogen at a pressure suitable for recycle purposes, and so as to produce net hydrogen at a pressure suitable for use in the relatively high pressure hydrotreating of sulfur-containing feedstocks, particularly since this affords an opportunity for the improved production of high purity hydrogen, and for the improved recovery of $C_3$–$C_4$ hydrocarbons during the reforming operation.

Therefore, it is one object of this invention to provide a process for the catalytic reforming of hydrocarbons to produce gasoline boiling range products.

It is another object to provide a catalytic reforming process affording improved production of high purity hydrogen and improved recovery of $C_3$–$C_4$ hydrocarbons.

It is still another object to provide a process for the catalytic reforming of hydrocarbons whereby the net hydrogen is produced at a pressure suitable for use in the high pressure hydrotreating of sulfur-containing feedstocks.

In one of its broad aspects, the present invention embodies a process for the catalytic reforming of a hydrocarbonaceous feedstock which comprises the steps of (a) contacting said feedstock with a reforming catalyst in a reforming zone in the presence of hydrogen at reforming conditions to produce an effluent stream comprising hydrogen admixed with hydrocarbon conversion products; (b) separating said effluent at a low pressure relative to the reforming pressure and forming a gaseous phase comprising hydrogen admixed with light hydrocarbon conversion products and a liquid hydrocarbon phase comprising the heavier hydrocarbon conversion products; (c) recovering the liquid hydrocarbon phase and introducing the same into a plural stage absorption zone as the hereinafter specified lean oil; (d) recycling a portion of said gaseous phase to the reforming zone as at least a portion of the hydrogen contained therein; (e) contacting the balance of said gaseous phase with the heretofore specified lean oil in said plural stage absorption zone at a high pressure relative to the reforming pressure and at a temperature of from about 90° to about 150° F. to produce a purified hydrogen stream and a light hydrocarbon-enriched lean oil stream; (f) recovering the purified hydrogen stream; and, (g) introducing the light hydrocarbon-enriched lean oil stream into a fractionation zone at conditions to produce an overhead fraction comprising said light hydrocarbon conversion products, and a higher boiling reformate fraction comprising said heavier hydrocarbon conversion products.

Another embodiment of this invention includes the above process wherein said reforming conditions include a pressure of from about 50 to about 250 psig.

A still further embodiment includes the above process wherein said absorption zone is operated at a temperature of from about 90° to about 150° F., and at a pressure of from about 300 to about 800 psig.

Other objects and embodiments of this invention will become apparent in the following detailed specification.

The present invention presents a further improvement in the art as set forth above. As will become apparent, the process of this invention provides for the recovery of a purified hydrogen stream from the net excess hydrogen from a hydrocarbon conversion process involving dehydrogenation, and affords a substantial improvement in the recovery of normally gaseous hydrocarbon conversion products therefrom.

The art of catalytic reforming is well known to the petroleum refining industry and does not require detailed description herein. In brief, the catalytic reforming art is largely concerned with the treatment of a petroleum gasoline fraction to improve its anti-knock characteristics. The petroleum fraction may be a full boiling range gasoline fraction having an initial boiling point in the 50°–100° F. range and an end boiling point in the 325°–425° F. range. More frequently, the gasoline fraction will have an initial boiling point in the 150°–250° F. range and an end boiling point in the 350°–425° F. range, this higher boiling fraction being commonly referred to as naphtha. The reforming process is particularly applicable to the treatment of those straight-run gasolines comprising relatively large concentrations of naphthenic and substantially straight-chain paraffinic hydrocarbons which are amenable to aromatization through dehydrogenation and/or cyclization. Various other concomitant reactions also occur, such as isomerization and hydrogen transfer, which are beneficial in upgrading the selected gasoline fraction.

Widely accepted catalysts for use in the reforming process typically comprise platinum on an alumina support. These catalysts will generally contain from about 0.05 to about 5 wt.% platinum. More recently, certain promoters or modifiers, such as cobalt, nickel, rhenium, germanium and tin, have been incorporated into the reforming catalyst to enhance the reforming operation.

Catalytic reforming is a vapor phase operation. Operating conditions include the presence of the hereinabove mentioned catalysts and a pressure of from about 50 to about 1200 psig., preferably from about 50 to about 250 psig. Satisfactory operating conditions further include a temperature of from about 500° to about 1050° F., perferably from about 600° to about 1000° F.; a liquid hourly space velocity of from about 0.2 to about 10; and sufficient hydrogen recycle to provide a hydrogen to hydrocarbon mole ratio in the reforming zone of from about 0.5 to about 15.

The catalytic reforming reaction is carried out at the aforementioned reforming conditions in a reaction zone comprising either a fixed or a moving catalyst bed. Usually, the reaction zone will comprise a plurality of catalyst beds, commonly referred to as stages, and the catalyst beds may be stacked and enclosed within a single reactor, or the catalyst beds may each be enclosed in a separate reactor in a side-by-side reactor arrangement. Generally, a reaction zone will comprise 2-4 catalyst beds in either the stacked or side-by-side configuration. The amount of catalyst used in each of the catalyst beds may be varied to compensate for the endothermic heat of reaction in each case. For example, in a three catalyst bed system, the first bed will generally contain from about 10 to about 30 vol.%; the second, from about 25 to about 45 vol.%; and the third, from about 40 to about 60 vol.%. With respect to a four catalyst bed system, suitable catalyst loadings would be from about 5 to about 15 vol.% in the first bed, from about 15 to about 25 vol.% in the second, from about 25 to about 35 vol.% in the third, and from about 35 to about 50 vol.% in the fourth.

The reforming operations further includes the separation of a hydrogen-rich vapor phase from the reaction mixture recovered from the reforming zone, at least a portion of which is recycled to the reforming zone. This separation is usually effected at substantially the same pressure as employed in the reforming zone, allowing for pressure drop in the system as heretofore mentioned, and at a temperature of from about 60° to about 120° F. to yield a vapor phase comprising relatively pure hydrogen. A principally liquid phase is further treated in a fractionation column for the recovery of reformed product, commonly referred to as reformate.

The further description of the present invention is presented with reference to the attached schematic drawing. The drawing represents one preferred embodiment of the invention and is not intended as an undue limitation on the generally broad scope of the invention as set out in the appended claims. Miscellaneous hardware such as certain pumps, compressors, condensers, heat exchangers, coolers, valves, instrumentation and controls have been omitted or reduced in number as not essential to a clear understanding of the invention, the utilization of such hardware being well within the purview of one skilled in the art.

In brief description, there is shown a catalytic reforming zone 2, a low pressure separator 4, a plural stage absorber 21, and a stabilizer column 30. The catalytic reforming zone 2 is preferably operated at reforming conditions including a relatively low pressure of from about 50 to about 250 psig. In view of the large pressure drop through a conventional catalytic reforming zone, typically comprising a plurality of stacked or side-by-side reactors, the reforming pressure referred to herein is intended as the pressure imposed at the top of the initial reactor of said reforming zone, and the pressure in the separator 14 is substantially the same as the reforming pressure allowing for pressure drop through the reforming zone. The low pressure separator 14 is operated at a temperature of from about 60° to about 120° F. The plural stage absorber is maintained at a pressure of from about 300 to about 800 psig., and at a temperature of from about 90° to about 150° F. The stabilizer column is suitably operated at a pressure of from about 250 to about 300 psig., a top temperature of from about 170° to about 300° F., and a bottoms temperature of from about 300° to about 500° F.

In a more specific example of the process of this invention, a petroleum-derived naphtha fraction is charged to a catalytic reforming zone 2 of the attached drawing, the naphtha fraction being introduced via line 1. A platinum-containing catalyst is contained in the reforming zone 2, and the reforming zone is maintained at high severity reforming conditions including a pressure of about 145 psig. The catalytic reforming zone effluent is withdrawn through line 3 and passed through a cooling means, not shown, into a low pressure separator 4 at a temperature of about 100° F., the separator 4 being maintained at substantially the same pressure as the reforming zone, allowing for pressure drop through the system. In the present case, the separator pressure is maintained at about 105 psig. A hydrogen-rich vapor phase, comprising hydrogen admixed with light ($C_1$-$C_5$) hydrocarbon conversion products, is recovered from the low pressure separator 4 by way of an overhead line 5 at a rate of about 11,912.3 lb-mols/hr.

High severity reforming as practiced herein, including a pressure of from about 50 to about 250 psig., effects an increased production of hydrogen in the catalytic reforming zone. As a result, the hydrocarbon concentration in the hydrogen-rich vapor phase from the low pressure separator is reduced to the point where the added utilities cost associated with the processing of said hydrocarbons in admixture with the hydrogen recycled to the reforming zone are insufficient to warrant the utilities cost associated with their separation. Accordingly, about 8,081.8 mols/hr are diverted from line 5 into line 6 for recycle to the catalytic reforming zone 2 and the recycle stream is processed through a recycle compressor 7 and reenters the catalytic reforming zone 2 by way of line 8 at the aforementioned pressure of about 145 psig. The balance of the hydrogen-rich vapor phase is transferred through line 9 to be increased in pressure stage-wise to about 600 psig. Accordingly, the gaseous stream is treated in a first stage compressor 10 wherein said stream is increased in pressure to about 261 psig. and a resulting temperature of about 211° F. The higher pressured gaseous stream is recovered in line 11, cooled to about 100° F. in a cooling means 12, and introduced into an interstage drum 14 via line 13. The interstage drum 14 is provided for a preliminary separation of condensate comprising hydrocarbon conversion products, said condensate being recovered through line 15 and further processed as hereinafter related. The gaseous stream recovered from the interstage drum through line 16 is increased in pressure to the aforementioned 600 psig. in a second stage compressor 17. This high pressure gaseous stream is recovered in line 18, cooled to about 100° F. in a cooling means 19, and charged to an absorber column 21 at a rate of about 3804.7 mols/hr.

Referring back to the aforementioned low pressure separator 4, a liquid hydrocarbon phase comprising the heavier hydrocarbon conversion products is recovered by way of line 22 at a rate of about 2087.2 mols/hr. This light hydrocarbon-lean hydrocarbon stream, hereinafter referred to as a lean oil stream, is processed through a pump 23 and delivered through line 24 to the aforementioned absorber column 21 at a pressure of about 600 psig. and at a temperature of about 100° F. The plural stage absorber 21 is such as is commonly employed to absorb normally gaseous hydrocarbons from a hydrogen stream utilizing a countercurrent liquid hydrocarbon stream as the absorbent. The plural stage absorber will preferably comprise a vertically positioned tower or column containing suitably spaced baffles, perforated trays or sieve decks which effect an intimate contact of the upwardly flowing gaseous materials with the gravitating lean oil absorbent. Alternatively, the plural stage absorber may comprise a tower or column suitably packed with beryl saddles, Raschig rings, or the like.

In the absorber 21, the principally hydrogen stream from line 20, comprising about 17 mol.% $C_1$-$C_5$ hydrocarbons, passes upwardly through plural stages in countercurrent contact with the gravitating lean oil stream from line 24. In the absorption process, effected at a temperature of about 100° F. and at a pressure of about 600 psig., a substantial portion of the light hydrocarbons contained in the hydrogen stream is absorbed in the gravitating lean oil stream, and a purified hydrogen stream comprising about 89.4 mol.% hydrogen is recovered through an overhead line 25 at a rate of about 3437.5 mols/hr. This represents a 98.4% hydrogen recovery.

The gravitating lean oil stream, enriched by the absorbed light hydrocarbons, is recovered from the bottom of the absorber column by way of line 26. This hydrocarbon stream is then combined with the aforementioned condensate recovered in the interstage drum 14, said condensate having been increased in pressure by means of pump 27 and transferred via line 28 to be combined with the hydrocarbon stream from line 26 at a pressure of about 600 psig. The combined stream, representing substantially all of the hydrocarbon conversion products, is continued through line 29 at a rate of about 2483.4 mols/hr and introduced into a stabilizer column 30. The stabilizer column is maintained at a pressure of from about 250 to about 300 psig., preferably about 275 psig., a top temperature of from about 170° to about 300° F., and at a bottoms temperature of about 300° to about 500° F., preferably about 465° F. An overhead vapor stream is recovered from the stabilizer column via line 31 and passed through a cooling means 32 to an overhead receiver 33. A gaseous phase comprising mainly residual hydrogen, methane, ethane and some higher molecular weight components is removed from the overhead receiver 33 via line 34 for use, for example, as a fuel gas. A liquid hydrocarbon condensate is recovered through line 35, a portion of which is recycled through line 36 to the stabilizer column 30 as reflux, the balance being withdrawn by way of line 37 at a rate of about 269.1 mols/hr. This latter stream withdrawn through line 37 comprises about 37.8 mol.% propane representing about a 45.7% recovery, and about 45.5 mol.% butanes representing a 67.3% recovery. The reformate product is recovered from the stabilizer column 30 by way of line 38 at a rate of about 2013.2 mols/hr.

The following data illustrates the composition of certain relevant streams which comprise the process of the above example representing one preferred embodiment of this invention.

| | Line No. | | | | | |
|---|---|---|---|---|---|---|
| | 3 | 6 | 9 | 20 | 25 | 34 |
| Component, lb-mols/hr | | | | | | |
| $H_2$ | 9,692.2 | 6,570.7 | 3,114.4 | 3,114.1 | 3,076.2 | 44.0 |
| $C_1$ | 440.0 | 296.7 | 140.6 | 140.5 | 127.1 | 13.9 |
| $C_2$ | 656.1 | 432.9 | 205.2 | 204.6 | 130.9 | 55.0 |
| $C_3$ | 553.4 | 340.6 | 161.5 | 159.9 | 54.1 | 57.1 |
| $iC_4$ | 173.3 | 94.6 | 44.8 | 43.8 | 11.1 | 14.9 |
| $nC_4$ | 239.5 | 121.6 | 57.6 | 55.9 | 13.3 | 14.8 |
| $iC_5$ | 168.1 | 62.8 | 29.8 | 27.8 | 6.8 | 0.4 |
| $nC_5$ | 104.8 | 34.6 | 16.4 | 15.0 | 3.7 | — |
| $C_6^+$ | 1,974.3 | 127.3 | 60.3 | 43.1 | 14.3 | — |
| Total | 14,001.7 | 8,081.8 | 3,830.6 | 3,804.7 | 3,437.5 | 200.1 |
| Lbs/hr | 308,842 | 76,632 | 36,322 | 36,249 | 17,969 | 6,239 |
| Mol. Wt. | 22.06 | 9.48 | 9.48 | 9.00 | 5.23 | 31.18 |
| B.p.s.d. $10^6$ | — | — | — | — | — | — |
| s.c.f.b. | — | 73.6 | 34.9 | 34.7 | 31.3 | 1.8 |

| | Line No. | | | | |
|---|---|---|---|---|---|
| | 24 | 26 | 28 | 29 | 37 | 38 |
| Component, lb-mols/hr | | | | | | |
| $H_2$ | 7.1 | 45.0 | 0.3 | 46.3 | 1.3 | — |

-continued

|  | | | | | | |
|---|---|---|---|---|---|---|
| $C_1$ | 2.7 | 16.1 | 0.1 | 16.2 | 2.3 | — |
| $C_2$ | 18.0 | 91.7 | 0.6 | 92.3 | 37.3 | — |
| $C_3$ | 51.3 | 157.1 | 1.6 | 158.7 | 101.6 | — |
| $iC_4$ | 33.9 | 66.6 | 1.0 | 67.6 | 52.7 | — |
| $nC_4$ | 60.2 | 102.9 | 1.7 | 104.6 | 69.7 | 20.1 |
| $iC_5$ | 75.5 | 96.5 | 2.0 | 98.5 | 4.2 | 93.8 |
| $nC_5$ | 53.8 | 65.1 | 1.4 | 66.5 | — | 66.5 |
| $C_6^+$ | 1,786.7 | 1,815.5 | 17.2 | 1,837.7 | — | 1,832.8 |
| Total | 2,089.2 | 2,456.5 | 25.9 | 2,483.4 | 269.1 | 2,013.2 |
| Lbs/hr | 195,888 | 212,168 | 2,072 | 214,241 | 13,060 | 194,942 |
| Mol. Wt. | 93.8 | 86.4 | 80.0 | 86.3 | 48.5 | 96.8 |
| B.p.s.d. | 11,176 | 19,290 | 202.6 | — | 1,685 | 16,875.4 |
| $10^6$ s.c.f.b. | — | — | — | — | — | — |

I claim as my invention:

1. A process for the catalytic reforming of a hydrocarbonaceous feedstock which comprises the steps of:
   (a) contacting said feedstock with a reforming catalyst in a reforming zone in the presence of hydrogen at reforming conditions to produce an effluent stream comprising hydrogen admixed with hydrocarbon conversion products;
   (b) separating said effluent at a low pressure relative to the reforming pressure and forming a gaseous phase comprising hydrogen admixed with light hydrocarbon conversion products and a liquid hydrocarbon phase comprising the heavier hydrocarbon conversion products;
   (c) recovering the liquid hydrocarbon phase and introducing the same into a plural stage absorption zone as the hereinafter specified lean oil;
   (d) recycling a portion of said gaseous phase to the reforming zone as at least a portion of the hydrogen contained therein;
   (e) contacting the balance of said gaseous phase with the heretofore specified lean oil in said plural stage absorption zone at a high pressure relative to the reforming pressure and at a temperature of from about 90° to about 150° F. to produce a purified hydrogen stream and a light hydrocarbon-enriched lean oil stream;
   (f) recovering the purified hydrogen stream; and,
   (g) introducing the light hydrocarbon-enriched lean oil stream into a fractionation zone at conditions to produce an overhead fraction comprising said light hydrocarbon conversion products, and a higher boiling reformate fraction comprising said heavier hydrocarbon conversion products.

2. The process of claim 1 further characterized with respect to step (a) in that said reforming conditions include a pressure of from about 50 to about 250 psig.

3. The process of claim 1 further characterized with respect to step (b) in that said relatively low pressure is from about 25 to about 50 psig. lower than the reforming pressure.

4. The process of claim 1 further characterized with respect to step (b) in that said separation is effected at a temperature of from about 60° to about 120° F.

5. The process of claim 1 further characterized with respect to step (e) in that said relatively high pressure is from about 300 to about 800 psig.

* * * * *